(12) United States Patent
Malmborg

(10) Patent No.: US 8,431,201 B2
(45) Date of Patent: Apr. 30, 2013

(54) PLASTIC CAP AND CONTAINER

(75) Inventor: Bengt Malmborg, Kågeröd (SE)

(73) Assignee: Modulpac AB, Lagan (SE)

( * ) Notice: Subject to any disclaimer, the term of this patent is extended or adjusted under 35 U.S.C. 154(b) by 1871 days.

(21) Appl. No.: 10/504,984

(22) PCT Filed: Feb. 13, 2003

(86) PCT No.: PCT/SE03/00236
§ 371 (c)(1),
(2), (4) Date: Apr. 5, 2005

(87) PCT Pub. No.: WO03/068625
PCT Pub. Date: Aug. 21, 2003

(65) Prior Publication Data
US 2005/0175810 A1    Aug. 11, 2005

(30) Foreign Application Priority Data
Feb. 13, 2002 (SE) ........................ 0200434

(51) Int. Cl.
B32B 25/00 (2006.01)
B32B 27/02 (2006.01)

(52) U.S. Cl. ............... 428/35.7; 428/34.1; 428/36.6; 215/274; 215/253; 215/272; 220/304; 220/906; 220/288

(58) Field of Classification Search ............ 215/274, 215/253, 272; 220/304, 906, 288; 428/34.1, 428/35.7, 36.6
See application file for complete search history.

(56) References Cited

U.S. PATENT DOCUMENTS

| | | | |
|---|---|---|---|
| 4,774,134 A | 9/1988 | Kehe et al. | |
| 5,927,532 A | 7/1999 | Traub | |
| 5,960,972 A * | 10/1999 | Larguia, Sr. | 215/274 |
| 6,105,807 A * | 8/2000 | McCrossen | 220/288 |

FOREIGN PATENT DOCUMENTS

| | | | |
|---|---|---|---|
| DE | 196 21 617 | | 4/1997 |
| EP | 0 332 725 | | 9/1989 |
| EP | 0332725 | * | 9/1989 |
| GB | 1 571 938 | | 7/1980 |
| GB | 1571938 | * | 7/1980 |

* cited by examiner

Primary Examiner — Ellen S Wood
(74) Attorney, Agent, or Firm — Buchanan Ingersoll & Rooney

(57) ABSTRACT

The invention concerns a plastic cap (1) and a container (4) using same. The plastic cap (1) comprises an oxygen-tight liner (8) to be joined to an opening end surface (6) of a spout (5) on the container (4). The cap (1) has a circumferential skirt (2) with an internal annular bead (3) adapted for snap connection with a corresponding annular groove (7) in the spout (5). The liner (8) has on the side facing the cap (1) a first plastic layer (81), which is arranged to be permanently joined, when injection-molding the cap (1), to the plastic material of the cap (1), and on the side facing the container (4) a second plastic layer (82), which is arranged to be temporarily hermetically sealed to said opening end surface (6). On the end facing the container (4), the skirt (2) has a radial projection (10) which serves as a thumb grip and which when opening the container (4) allows the cap (1) to be bent away from said opening end surface (6) so that the temporary, hermetic seal between the second plastic layer (82) of the liner (8) and the opening end surface (6) of the spout (5) is gradually broken. The liner (8) comprises an intermediate layer (83) which is made of metal material enabling induction welding of the cap (1) to the opening end surface (6) of the container (4).

5 Claims, 2 Drawing Sheets

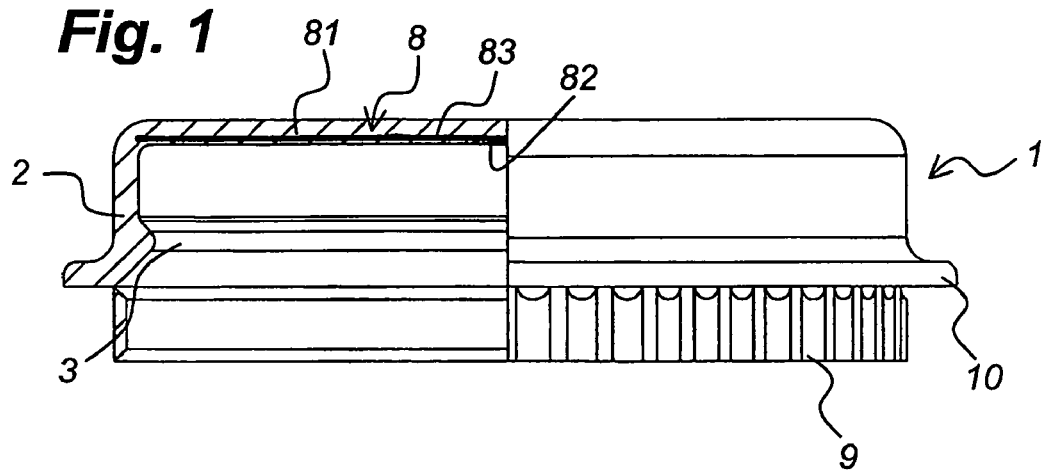
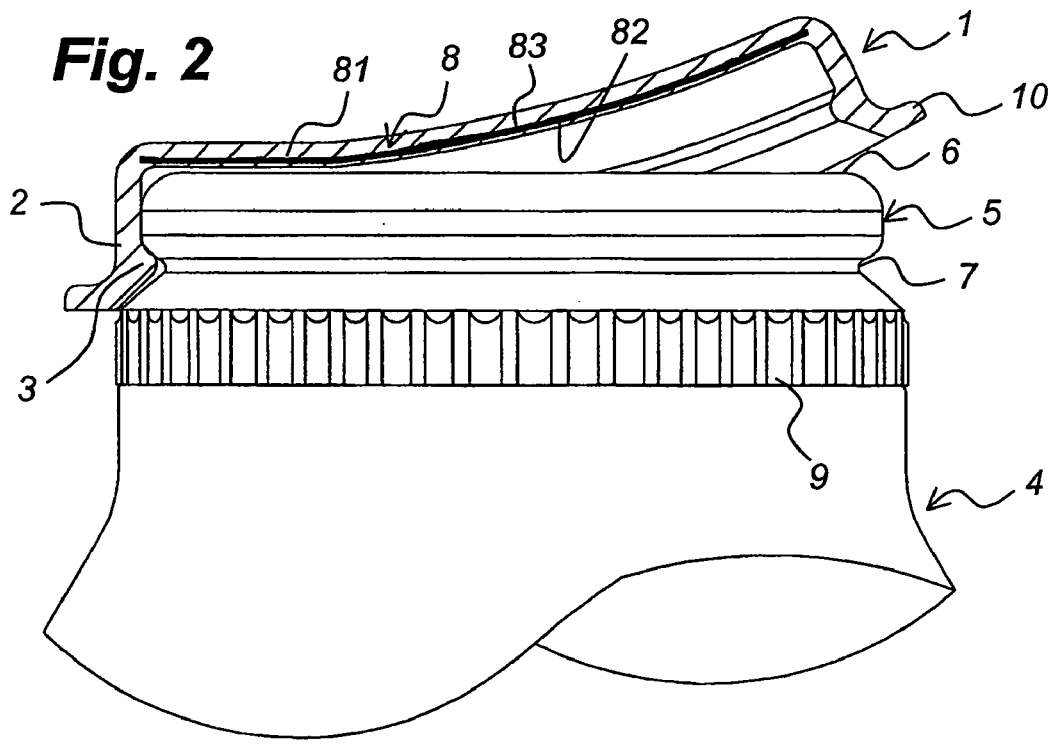

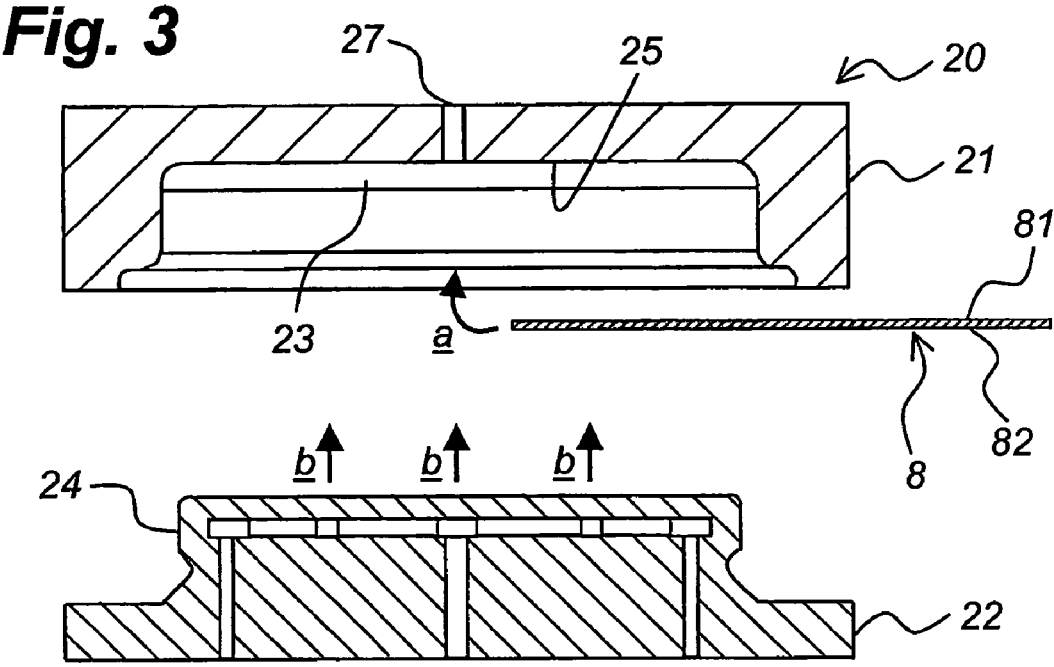
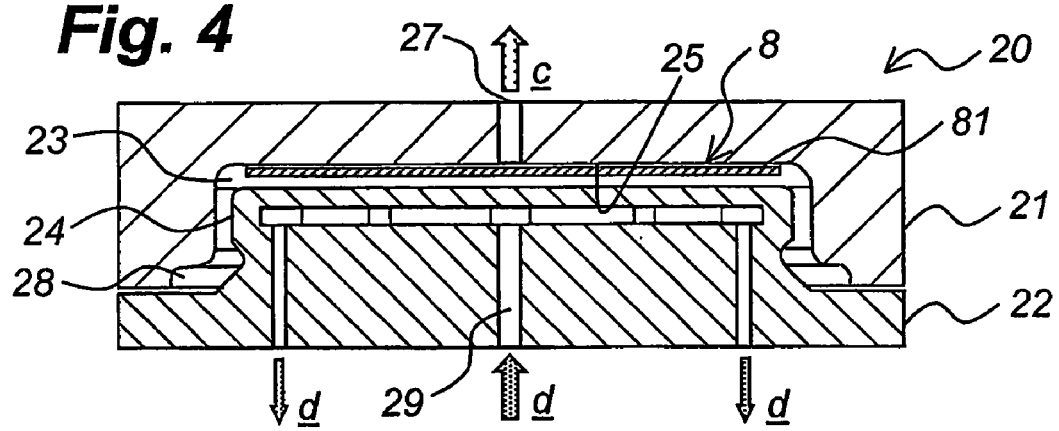
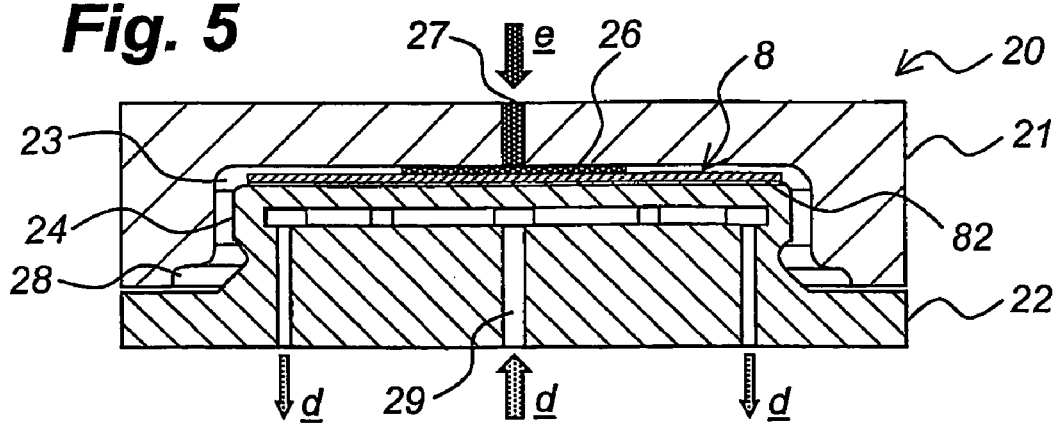

PLASTIC CAP AND CONTAINER

FIELD OF THE INVENTION

The present invention relates to a plastic cap and a container using same. For oxygen-tight sealing of the container, said cap comprises an oxygen-tight liner to be joined to an opening end surface of a spout on the container and, for attachment to the spout, has a circumferential skirt, which is arranged to surround the spout and which has an internal annular bead adapted for snap connection with a corresponding annular groove in the spout, the liner having an oxygen-tight intermediate layer, whose side facing the cap is coated with a first plastic layer arranged to be permanently joined to the cap and whose side facing the container is coated with a second plastic layer arranged to be temporarily hermetically sealed to said opening end surface, and the liner and the cap being joined to each other such that the liner when removing the cap from the spout accompanies the cap.

BACKGROUND OF THE INVENTION

A cap of the type stated by way of introduction is known from patent specification GB-A-1,571,938. More specifically, this document discloses temporary, hermetic sealing between an opening end surface on the spout of a container and an oxygen-tight liner, which is mounted in the cap, and permanent joining of the liner and the cap, preferably by induction heating of plastic layers on both sides of the liner after the mounting of the cap on the container.

A first drawback of this method is that the mounting of the liner in the cap requires precise positioning of the cap before the insertion of the liner, i.e. it requires a special mounting unit, which first turns the cap right and then inserts the liner. A second drawback is that, no matter where in the production line this mounting unit is placed, there is still a risk that a liner will fall out of the cap again, thus making a hermetic seal between a container and the defective cap impossible to obtain.

A manufacturing method, other than that disclosed in GB-A-1,571,938, is described in DE-A1-196 21 617. According to this patent specification, which relates to a screw cap, a liner is inserted into a mould, in which the liner is positioned in a manner which is not described in greater detail. Then plastic is injected into the mould, thereby causing a special separation layer on one side of the liner to be melted with the plastic material of the cap. Finally, the cap is mounted on the spout of a container, where the liner is glued by means of a glue thread applied to the end surface of the spout. When removing the cap from the container, the liner remains on the container, since the adhesive force of the glue thread exceeds the adhesive force of the separation layer of the liner.

A first drawback of the solution according to DE-A1-196 21 617 is that, irrespective of the type of container, it is necessary to apply the glue thread in connection with the mounting of the cap on the container and that this application of the glue thread constitutes an extra operation, which has to be carried out before the mounting of the actual cap. A second drawback is that the liner, which remains after the removal of the cap, prevents quick opening of the container. Furthermore, the remaining cap makes it more difficult in particular for disabled people to open the container. In addition, it is stated in DE-A1-196 21 617 that the liner is inserted into the mould when making the cap, but it is not stated where in the mould it should be placed.

In these circumstances, it is reasonable to assume that the liner is supposed to be placed in the mould in the same way as in previously known patent specification U.S. Pat. No. 4,774,134. According to this document, a liner having a first flat side of a meltable plastic material is placed with an opposite second flat side on a core of a mould, after which the mould is closed and plastic is injected round the core and the liner placed thereon. This causes the plastic and the plastic material of the liner to melt together, thus being permanently joined.

A first drawback of the solution according to U.S. Pat. No. 4,774,134 is that an extra operation has been added after the manufacturing of the cap, in which operation an annular packing in the form of a string of sealing material is injected into the cap. A second drawback is that the positioning of the liner on the core of the mould slows down the cooling process of the core when the mould is open, which may result in a considerably longer cycle time. The vacuum channels for retaining the liner on the core also make it more difficult to provide coolant channels in the core, which channels could contribute to a reduced core temperature and thus a reduced cycle time.

Another cap in the form of a screw cap, which has some features in common with the cap stated by way of introduction, is already known from patent specification U.S. Pat. No. 5,927,532. More particularly, this specification discloses a child-resistant cap, which in one embodiment has an insert with a thin liner, which may be welded to an end surface of the spout on a container to obtain oxygen-tightness. When opening the container, the weld joint is broken by lifting the insert at the same time as the cap since the insert is pulled along by a circumferential bead in the cap. It is thus possible to remove the cap and to break the oxygen-tight seal in one single grip.

A first drawback of this prior-art cap is that it is comparatively difficult to manufacture, since it consists of several parts that have to be assembled in a separate mounting operation. A second drawback is that the lifting motion to break the seal has to be carried out by pulling the container and the cap apart, which requires a relatively great force and often results in a sudden opening motion, which may cause spillage of part of the contents of the container. Another drawback is that the division of the opening operation into two separate steps makes it difficult to know if the seal has been broken or not.

OBJECT OF THE INVENTION

In the light of that stated above, the object of the present invention is to provide a plastic cap, which is considerably easier to manufacture and to open than prior-art solutions. Another object of the invention is to provide a container using such a cap.

SUMMARY OF THE INVENTION

The first object is achieved according to the invention by means of a cap which is of the type stated by way of introduction and which is characterised in that said first plastic layer is arranged to be permanently joined, when injection-moulding the cap, to the plastic material of the cap, and that the skirt at the end facing the container has a radial projection, which serves as a thumb grip and which when opening the container allows the cap to be bent away from said opening end surface so that the temporary, hermetic seal between the second plastic layer of the liner and the opening end surface of the spout is gradually broken, wherein the intermediate layer of the liner is made of a metal material enabling induction welding of the cap to the opening end surface of the container.

By joining the liner directly to the cap in connection with the injection-moulding, instead of placing the liner in the finished cap after injection-moulding, a much simpler and cheaper solution is obtained than in GB-A-1,571,938. Furthermore, this solution presents the advantage that the liner cannot fall out of the cap, since it is already permanently joined to the plastic material of the cap in the injection-moulding. Moreover, the radial projection serving as a thumb grip is a more user-friendly solution than the pull tab according to the British patent specification, since the pull tab is intended for a thumb-index finger grip, which requires strong fingers and the use of both hands, one hand for holding the container and the other for the thumb-index finger grip. As for the thumb grip used for the cap according to the invention, it can be obtained with one hand only, by the user's hand surrounding the container and the thumb making an opening motion towards the radial projection in the axial direction of the container. This axially directed opening motion can, of course, also be obtained in some other suitable manner, for example, by the radial projection being applied to the edge of a table and the container being moved downwards relative to this edge, and this motion is even easier to carry out as the cap, when opening the container, is bent away from the opening end surface of the container so that the temporary, hermetic seal between the second plastic layer of the liner and the opening end surface of the spout is gradually broken. This feature is not stated in any one of the patent specifications mentioned above, in particular not in connection with the cap according to GB-A-1,571,938, in which radial reinforcing flanges are arranged to prevent bending. Furthermore, the metal material is preferably a thin aluminium foil, but also other metal materials suitable for this purpose may be used. The advantage of induction welding is that the heat, owing to the metal material, is automatically concentrated to the desired location, i.e. to the boundary layer between the liner and the opening end surface of the spout.

Preferably, said radial projection is a flange extending along the entire circumference of the cap. The advantage of this solution is that a cap designed in this manner is easy to open, irrespective of the position of the container, i.e. the solution is particularly suitable, for example, for beverage packages which should be openable by a quick snap motion with the thumb.

It goes without saying that the skirt may have a tamper-evident ring at the end facing the container, which ring is arranged to cooperate with a corresponding retaining means on the spout and to be broken off from the cap when removing the cap from the spout. It will be understood that such a tamper-evident ring can be designed in a number of appropriate ways and that the corresponding retaining means on the spout may, for example, in the case of a snap cap be a circumferential groove.

The second object is achieved according to the invention by means of a container making use of such an inventive cap.

BRIEF DESCRIPTION OF THE DRAWINGS

Below a preferred embodiment of a cap and a preferred method of making the same are described in more detail with reference to the accompanying schematic drawings, in which FIG. 1 is a view partially in cross-section of a cap in the form of a snap cap with a tamper-evident ring;

FIG. 2 is a view of the snap cap when being removed from a container; and

FIGS. 3-5 show different steps of the manufacturing of a cap in the form of a snap cap without a tamper-evident ring.

DETAILED DESCRIPTION OF THE PREFERRED EMBODIMENT AND THE METHOD OF MAKING THE SAME

FIGS. 1 and 2 show a preferred embodiment of a plastic cap 1 according to the invention. As is evident, the plastic cap 1 is in the form of a snap cap, which has a circumferential skirt 2 with an internal annular bead 3, and is intended for a container 4, such as a beverage bottle made of plastic. The container 4 has a spout 5 with a flat opening end surface 6 facing the cap 1 and (with reference to the drawing) below the spout an annular groove 7. The annular bead 3 engages in this groove when the cap 1 is in its closed state and retains the cap 1 safely on the spout 5 of the container 4 by snap connection.

To ensure the longest possible shelf life of the contents of the container 4, the cap 1 has to engage the above-mentioned opening end surface 6 in a completely oxygen-tight sealing manner. To achieve this, an oxygen-tight liner 8 is arranged in the cap 1, in this case in the form of a thin aluminium foil 83 with a heat-weldable plastic layer 81, 82 on both sides thereof. The liner 8 has been placed in the cap 1 when injection-moulding the cap and, after mounting of the cap 1 on the spout 5 of the container 4, it has been welded by induction-welding to the opening end surface 6 of the spout 5.

Besides the sealing of the cap 1 provided by the induction welding, the cap 1 is also tamper-proof sealed by means of a circumferential tamper-evident ring 9. As shown in the drawings, this tamper-evident ring 9 is attached to the cap 1 below the skirt 2 of the cap 1 and, when the cap 1 is mounted on the spout 5 of the container 4, it engages in a circumferential groove (not shown) of the spout 5. When opening the cap 1, which is done as shown in FIG. 2 by the cap 1 being pressed away from the spout 5, the tamper-evident ring 9 is broken off and the weld joint between the liner 8 and the opening end surface 6 of the spout 5 is also broken, so that the contents of the container 4 are directly accessible.

Furthermore, the skirt 2 of the cap 1 has a radial projection 10 serving as a thumb grip at the end facing the tamper-evident ring 9 to make it easier for a user to open the container 4. This projection 10 is preferably formed as an outwardly directed annular flange but it may, of course, be designed in any suitable way.

The cap 1 described above is preferably made by a manufacturing method which is described below with reference to a somewhat simpler cap variant without a tamper-evident ring, but for the sake of clarity the same reference numerals as for the preferred embodiment are used.

As appears from FIG. 3, the manufacturing is carried out by means of a mould 20 comprising a first mould part with a cavity and a second mould part 22 with a core, and it starts by a liner 8 being inserted, with the mould 20 being open, as indicated by the arrow a into the cavity 23 of the first mould part 21, where it is applied to a mould wall 25 with a first flat side 81. The liner 8 is now retained against the mould wall 25 by a negative pressure, which in this case is illustrated by the arrow c, being allowed to act through a central opening 27 in the mould wall. Then the mould 20 is closed in the direction of the arrows b by means of the second mould part 22, whose core 24 is then inserted into the cavity 23 of the first mould part 21.

According to FIG. 4, the liner 8 is still retained against the mould wall 25 in the closed mould 20 by negative pressure c and thus has no contact yet with the core 24 of the mould 20. This core 24 is preferably intersected by cooling channels 29, through which a coolant, indicated by the arrows d, can be passed to regulate the temperature of the core 24.

With reference to FIG. 5, plastic 26 is now injected (the arrow e) through the central opening 27 in the mould wall 25 onto the first flat side 81 of the liner 8, which as previously mentioned consists of a first plastic layer. The injected plastic 26 flows over the flat side 81, presses an opposite second flat side 82 (which is also a plastic layer) of the liner 8 against the core 24 and completely fills a remaining cavity 28 between the mould parts 21, 22. Finally, the mould 20 is opened and the finished cap 1 is removed with the liner 8 embedded therein, after which the insertion step illustrated in FIG. 3 begins again.

A person skilled in the art will realise that the invention may be varied in a number of ways within the scope of the claims. It is thus conceivable to use different types of liners, such as a liner with more layers or layers other than those described above, and to arrange caps on other types of containers than plastic bottles or plastic cans, such as glass bottles or metal cans.

The invention claimed is:

1. A plastic cap for a container (4), which cap (1), for oxygen-tight sealing of the container (4), comprises:
   an integral oxygen-tight liner (8) to be joined to an opening end surface (6) of a spout (5) on the container (4) and, for attachment to the spout (5), has a circumferential skirt (2), which is arranged to surround the spout (5) and which has an internal annular bead (3) adapted for snap connection with a corresponding annular groove (7) in the spout (5),
   wherein the integral oxygen-tight liner (8) having an oxygen-tight intermediate layer (83), whose side facing the cap (1) is coated with a first plastic layer (81) arranged to be permanently joined to the cap (1) and whose side facing the container (4) is coated with a second plastic layer (82) arranged to be temporarily hermetically sealed to said opening end surface (6), and the integral oxygen-tight liner (8) and the cap (1) being joined to each other such that the integral oxygen-tight liner (8) when removing the cap (1) from the spout (5) accompanies the cap (1),
   wherein said first plastic layer (81) is arranged to be permanently joined, when injection-moulding the cap (1), to the plastic material of the cap (1), and that the skirt (2) at the end facing the container (4) has a radial projection (10), which serves as a thumb grip and which when opening the container (4) allows the cap (1) and the integral oxygen-tight liner (8) to be bent away from said opening end surface (6) so that the temporary, hermetic seal between the second plastic layer (82) of the integral oxygen-tight liner (8) and the opening end surface (6) of the spout (5) is gradually broken,
   wherein the intermediate layer (83) of the integral oxygen-tight liner (8) is made of metal material enabling induction-welding of the cap (1) to the opening end surface (6) of the container (4).

2. A plastic cap as claimed in claim 1, in which said radial projection is a flange (10) extending along the entire circumference of the cap (1).

3. A plastic cap as claimed in claim 1, in which the skirt (2) at the end facing the container (4) has a tamper-evident ring (9), which is arranged to cooperate with a corresponding retaining means on the spout (5) and to be broken off from the cap (1) when removing the cap (1) from the spout (5).

4. A plastic cap as claimed in claim 2, in which the skirt (2) at the end facing the container (4) has a tamper-evident ring (9), which is arranged to cooperate with a corresponding retaining means on the spout (5) and to be broken off from the cap (1) when removing the cap (1) from the spout (5).

5. A plastic cap for a container (4), which cap (1), for oxygen-tight sealing of the container (4), comprises an integral oxygen-tight liner (8) to be joined to an opening end surface (6) of a spout (5) on the container (4) and, for attachment to the spout (5), has a circumferential skirt (2), which is arranged to surround the spout (5) and which has an internal annular bead (3) adapted for snap connection with a corresponding annular groove (7) in the spout (5),
   said integral oxygen-tight liner (8) comprising an oxygen-tight intermediate layer (83) having a side facing the cap (1) which is coated with a first plastic layer (81) and a side facing the container (4) which is coated with a second plastic layer (82),
   said intermediate layer (83) being made of metal material,
   said first plastic layer (81), when injection moulding the cap (1), being permanently joined to the cap (1), and
   said second plastic layer (82), being arranged to be temporarily hermetically sealed to said opening end surface (6) by induction-welding enabled by said intermediate layer (83),
   said skirt (2) at the end facing the container (4) having a radial projection (10), which serves as a thumb grip and which when opening the container (4) allows the cap (1) and the integral oxygen-tight liner (8) therein to be bent away from said opening end surface (6),
so that the temporary, hermetic seal between the second plastic layer (82) of the integral oxygen-tight liner (8) and the opening end surface (6) of the spout (5) is gradually broken.

* * * * *